Sept. 2, 1958   M. S. DE LUCIA   2,850,619
BENCH WELDER
Filed Oct. 30, 1956   2 Sheets-Sheet 2
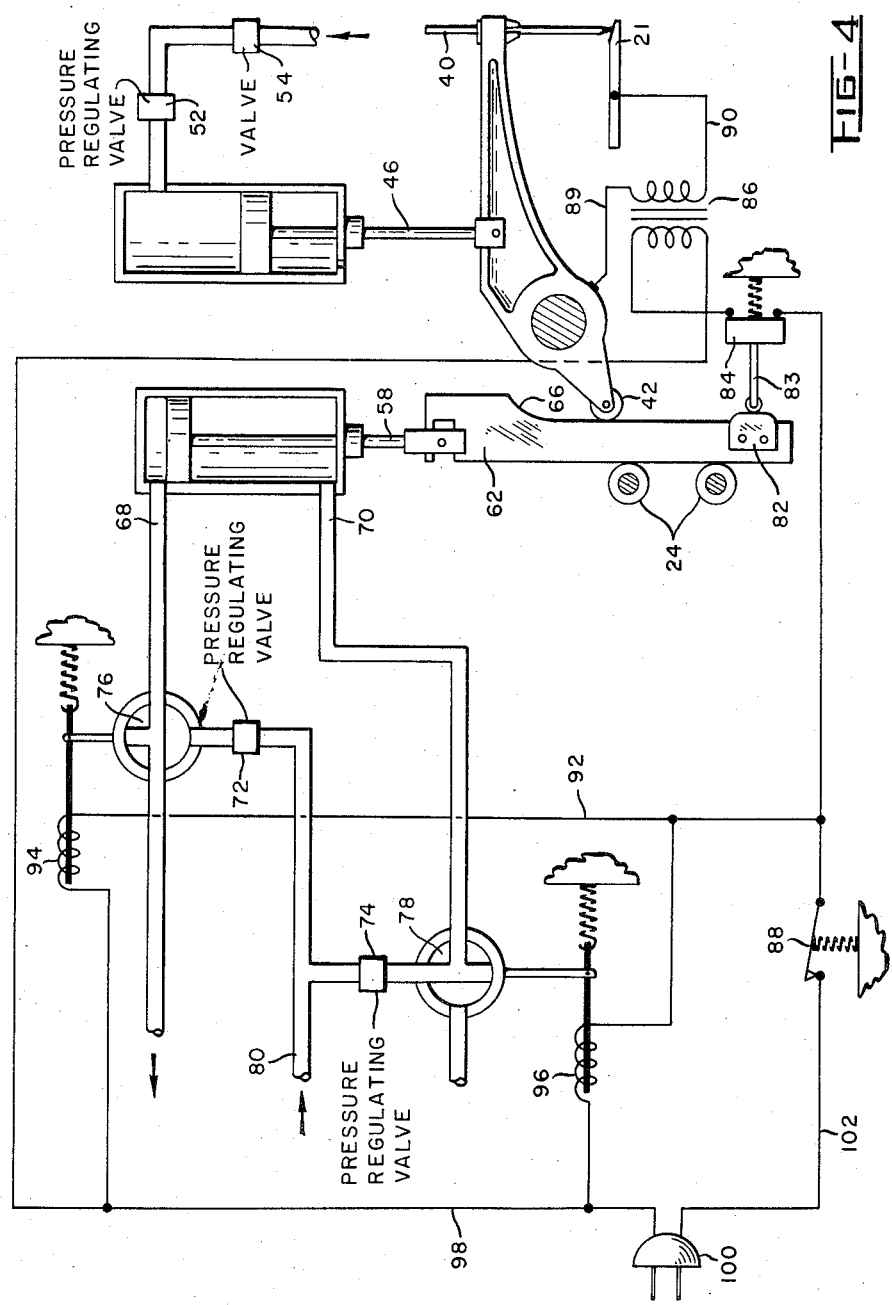
INVENTOR
MARION S. DE LUCIA
BY  *Michael Hertz,*
ATTORNEY

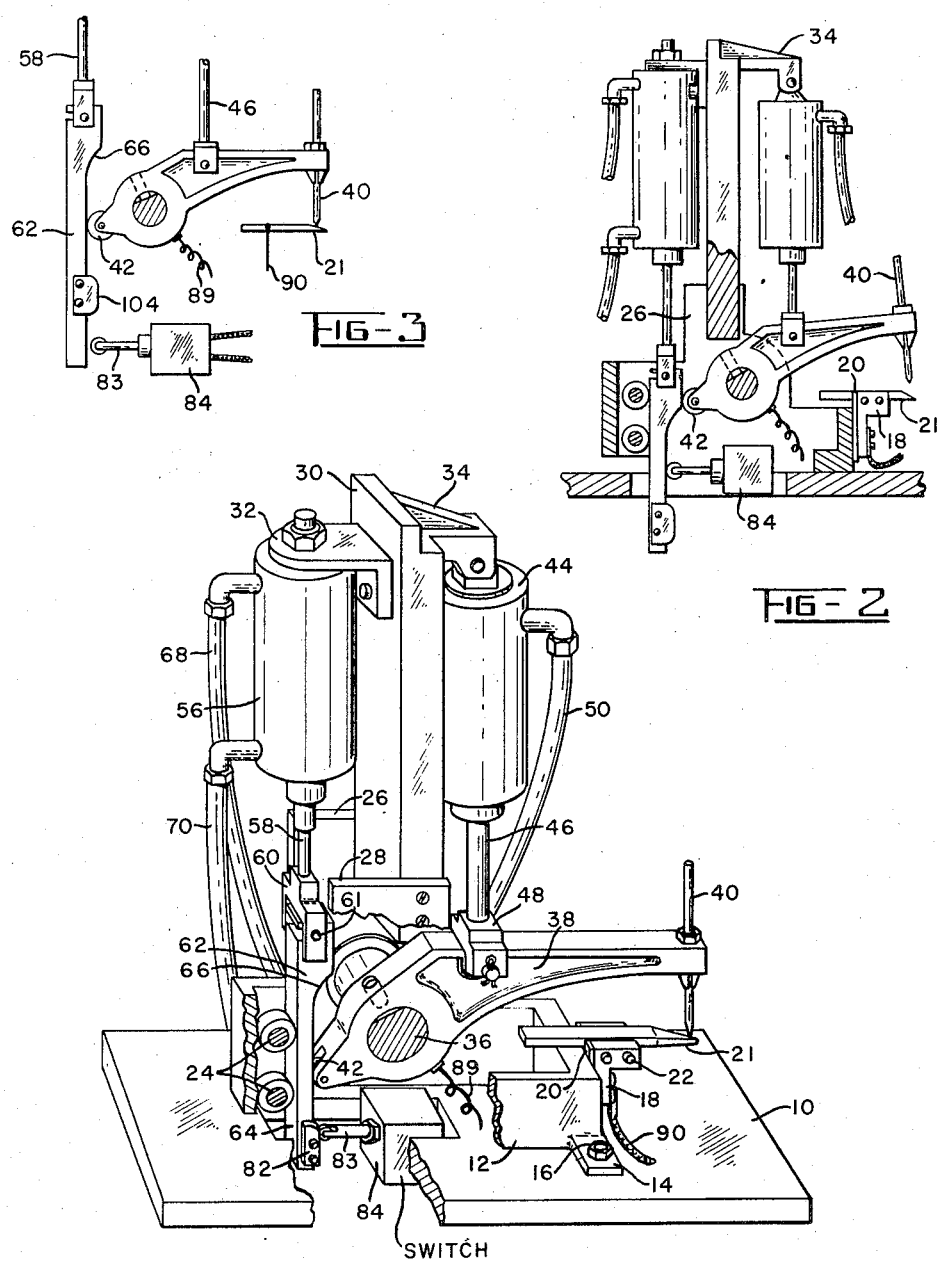

United States Patent Office 2,850,619
Patented Sept. 2, 1958

2,850,619

BENCH WELDER

Marion S. De Lucia, Emporium, Pa., assignor to Sylvania Electric Products Inc., a corporation of Massachusetts Application October 30, 1956, Serial No. 619,294

11 Claims. (Cl. 219—89)

This invention relates to an electric resistance welder wherein work pieces to be welded are juxtaposed and positioned between two electrodes which are pressed against the work pieces and current is passed through the pieces to weld them together.

In such welding operation it is often desirable to maintain a constant pressure on the work pieces by the electrodes irrespective of the thickness of the work pieces. It is further desirable at times to maintain the welding duration constant by mechanical means rather than electrical means.

It is an object of this invention to provide means whereby such constant application of pressure to the work pieces by the electrodes may be attained.

It is a further object of the invention to provide novel mechanical means for controlling the duration of flow of the welding current.

It is a still further object of the invention to provide means whereby arcing between the electrodes and the work pieces upon release of pressure of the same on the work pieces is avoided.

These and other objects will become apparent upon consideration of the following specification when taken in conjunction with the accompanying drawings in which Fig. 1 is a perspective view of the welding apparatus with parts broken away to expose otherwise hidden portions.

Fig. 2 is a vertical side elevation of the welding apparatus with the electrodes shown in separated relationship.

Fig. 3 is a view of a portion of the apparatus showing a modified control for the flow of the welding current, and Fig. 4 is a schematic showing the electrical circuit of the welder and the relationship of the circuit to mechanical parts of the welder.

Referring to the drawings in greater detail, at 10 there is disclosed a base to which is fastened a box frame 12 as by means of lugs 14 and bolts 16, only one of which is shown in the drawings. Supported at the front end of the box frame is an angled electrode support 18, the support being insulated from the frame by suitable means including the insulating spacer strip 20. The upper face of the support is channeled, and a horizontal bottom electrode 21 is clamped in the channel as by set screws 22 with a beveled edge extending forwardly of the support toward an operator and the rear end above the level of the box frame and out of electrical contact therewith. The rear end of the box frame is higher than the front end and supports a pair of roller bears 24 between side walls thereof. Also the side walls of the box frame near the rear ends thereof are extended upwardly as shown at 26 and 28 to form standards across which is mounted a vertical plate 30 supporting at its upper end, on the rear face thereof, a bracket 32 and on the front face thereof a bracket 34. Mounted in and between the side walls and in their extensions 26, 28 is a pivotal shaft 36 to which is non-rotatably fastened a bell crank lever 38, the forward end of which vertically adjustably supports an electrode 40 and the rear end of which supports, in a forked portion thereof, an anti-friction roller 42. Pivotally mounted on the bracket 34 is an air cylinder 44 whose single acting piston 46 is provided with a clevis 48 pivotally connected to the bell crank lever 38 forwardly of its pivot 26. In use, the cylinder above the piston is constantly supplied, via hose 50, with gas, as air, under constant pressure; for this purpose there is provided, as shown diagrammatically in Fig. 4, a pressure regulating valve 52 which will maintain the pressure in the cylinder constant irrespective of the position of the piston in the cylinder. An on and off valve 54 is also provided in the supply. The lower end of the cylinder is vented to atmosphere. In operation the constant pressure in the cylinder forces the upper electrode down onto a work piece or pieces supported on the lower electrode, this pressure remaining unchanged for any thickness of work pieces supported between the electrodes.

To effect displacement of the upper electrode from the lower to enable insertion and removal of work pieces, there is provided a second cylinder 56 and double acting piston 58. The cylinder 56 is rigidly supported by the bracket 32 in any conventional fashion while the piston has a fork 60 attached to its lower end. The fork has a cross pin 61 to enable the upper end of a slotted cam bar 62 to be hooked thereover, during assembly of the welder. The cam bar has a rear plane face 64 cooperating with the rollers 24 to be guided thereby in its vertical reciprocation, while the front flat face has a forwardly projecting cam 66 on the upper end of the bar. The roller 42 of the bell crank lever 38 is constantly urged against the front face of the cam bar by gravity and by operation of the air motor 44, 46. The electrodes 21 and 40 are allowed to approach each other in all positions of the cam bar except when the piston 58 is fully lowered. At this time the cam 66 is effective to pivot the lever 38 and raise the electrode 40 against the pressure exerted by the piston 46. The cylinder 56 is supplied by two air lines 68, 70 with a pressure regulating valve 72 or 74 in each line. Each of the lines is under control of an electromagnetically operated three-way valve 76, 78. Air is conducted to the three-way valves by a pressure line 80.

At the lower end of the cam bar is a cam plate 82 operative on the plunger 83 of a switch 84 to close the circuit to the primary of series connected welding transformer 86.

Also there is provided a normally open foot operable switch 88 in series with the switch to control the welding current flow. The secondary of the transformer is connected via leads 89 and 90 to the two electrodes, the lead 89 being grounded to any suitable part of the welder and the lead 90 being connected to the insulated angled electrode support 18.

Connected between the switches 88 and 84 is a line 92 leading to a pair of parallelly connected solenoids 94 and 96, the opposite ends of the solenoids and the otherwise unconnected end of the primary of the transformer being connected via line 98 to the service plug 100, as is the line 102 leading to the switch 88. When the foot switch 88 is closed, the two solenoids 94, 96 in known fashion effect rotation of the valves to cause the piston 58 to rise thereby allowing the upper electrode 40 to approach the work pieces supported on the lower electrode 21. However, no current will flow through the transformer 86 until the cam bar is almost fully raised. At this time cam plate 82 will force switch 84 to close, thereby allowing welding current to flow through the work pieces. On release of foot pressure on switch 88 the valves 76 and 78 will be rotated to cause the cam bar 62 to move downwardly thereby first of all allowing the switch 84 to open to stop welding current from flowing and to prevent arc over when the electrodes are separated, and, finally, effecting separation of the electrodes by engagement of the roller 42 with the cam 66. The rate of rise and descent of the cam bar can be regulated through setting of the valves 72 and 74.

With the heretofore described structure, the welding transformer is energized, once switch 84 is closed, as long as the operator maintains pressure on switch 88. Sometimes it is desirable to allow current to flow for only a fixed limited time and be independent of the operator maintaining the foot switch closed. This is effected mechanically by the variation of the invention disclosed in Fig. 3.

Instead of mounting a cam plate at the lower end of the cam bar, a cam plate, such as 104, may be mounted intermediate the ends of the bar. Then initially, on closure of foot switch 88, as the bar 62 is moved upward, the electrodes are caused to approach each other. During continual upward motion of the cam bar the cam plate 104 traverses and depresses the plunger 83 of switch 84 for a brief period of time, closing the switch and for this period allowing welding current to pass from one electrode to the other. The duration of the welding current flow is determined by the length of the cam plate and the speed of upward movement of the cam bar is determined in part by the setting of the regulating valve 74. On the reverse stroke of the cam bar the cam plate 104 is ineffective to close the circuit to the welding transformer since at this time the foot switch 88 is open. This switch it will be recalled is in series with switch 84. There is therefore a break in the circuit to the transformer.

Having thus described the invention, what is claimed as new is:

1. A welding apparatus comprising a lever, an electrode mounted on the lever, a fixed electrode cooperating with the lever mounted electrode, an air motor having a piston connected directly to said lever to cause the electrodes to approach each other and a second motor means acting on the lever overcoming the action of the air motor to cause the electrodes to separate from one another.

2. A welding apparatus comprising a first fixed electrode, a two armed lever, a second electrode mounted in one of the arms of said lever, an air motor operating on the same arm to urge the electrodes together, and a second motor operating on the other arm of the lever which when energized is operative to overcome the force of the air motor and effect separation of the electrodes.

3. A welding apparatus comprising a first fixed electrode, a two armed lever, a second electrode mounted in one of the arms of said lever, an air motor operating on the same arm to urge the electrodes together, a second motor which when energized is operative to overcome the force of the air motor, a welding transformer connected to said electrodes, a switch in series with the welding transformer, a cam bar connected to said second motor and movable therewith, a first cam on an end of said bar effective at the end of motion of the bar to engage the other arm of the lever to effect the separation of the electrodes and a second cam at a location on said bar removed from said end of the bar engageable with said switch to operate the same.

4. A welding apparatus comprising a fixed electrode, a lever having a pair of arms, a movable electrode mounted in one of the arms of the lever, an air motor operating on said arm to effect approach movement of the movable electrode toward the fixed electrode, a welding transformer connected to the electrodes, a first switch in series therewith, a second operator controlled switch in series with said first switch, motor means operating on the other of said arms of the lever for overcoming the first motor effecting separation of the electrodes, means operative in response to closure of the operator operated switch to effect operation of the motor means, and means movable with the motor means to effect closure of the first switch to close the circuit to the welding transformer.

5. A welding apparatus comprising a fixed electrode, a two armed lever supporting a second electrode, an air motor operating on one arm of said lever to move its electrode toward the fixed electrode, a second motor, a reciprocatable cam bar connected to said second motor, said cam bar having a first cam at one end thereof, means on the other arm of the lever engaged by said cam at the end of bar stroke to oscillate the lever and move the second electrode away from the fixed electrode and against the action of the air motor, a second cam on said cam bar displaced longitudinally of the bar from said first cam, a first operator controlled switch, a second switch in series with the first switch and in the path of movement of the second cam, said second switch being in series with a welding transformer connected to the electrodes, control means for the movement of the second motor including a line connected in between the two switches so that operation of the first switch alone may operate the control means without energization of the transformer, said transformer being also energized when the second switch is closed.

6. A welding apparatus comprising a fixed electrode, a support, a movable electrode, mounted on said support, constant gaseous pressure means having a movable element rigidly connected to the support and acting on said movable electrode to urge it toward said fixed electrode and other means acting on said movable electrode to effect separation of electrodes.

7. A welding apparatus comprising a lever, an electrode mounted on the lever, a fixed electrode cooperating with the lever mounted electrode, an air motor under constant pressure having a movable element rigidly connected to the support and acting on said lever to cause the electrodes to approach each other and a second motor means acting on the lever overcoming the action of the air motor to cause the electrodes to separate from one another.

8. A welding apparatus comprising a first fixed electrode, a two armed lever, a second electrode mounted in one of the arms of said lever, an air motor under constant pressure operating on the same arm to urge the electrodes together, and a second motor operating on the other arm of the lever which when energized is operative to overcome the force of the air motor and effect separation of the electrodes.

9. A welding apparatus comprising a first fixed electrode, a two armed lever, a second electrode mounted in one of the arms of said lever, an air motor operating on the same arm to urge the electrodes together, a second motor which when energized is operative to overcome the force of the air motor, a switch, a welding circuit including the electrodes and switch in series, a cam bar connected to said second motor and movable therewith, a first cam on an end of said bar effective at the end of motion of the bar to engage the other arm of the lever to effect the separation of the electrodes and a second cam at a location on said bar removed from said end of the bar engageable with said switch to operate the same.

10. A welding apparatus comprising a fixed electrode, a lever having a pair of arms, a movable electrode mounted in one of the arms of the lever, an air motor operating on said arm to effect approach movement of the movable electrode toward the fixed electrode, a switch, a welding circuit including the electrodes and switch in series, a second operator controlled switch in series with said first switch, motor means operating on the other of said arms of the lever for overcoming the first motor effecting separation of the electrodes, means operative in response to closure of the operator operated switch to effect operation of the motor means, and means movable with the motor means to effect closure of the first switch to close the circuit to the electrodes.

11. A welding apparatus comprising a fixed electrode, a two armed lever supporting a second electrode, an air motor operating on one arm of said lever to move its electrode toward the fixed electrode, a second motor, a reciprocatable cam bar connected to said second motor, said cam bar having a first cam at one end thereof, means on the other arm of the lever engaged by said cam at the end of bar stroke to oscillate the lever and move the second electrode away from the fixed electrode and against the action of the air motor, a second cam on said cam bar displaced longitudinally of the bar from said first cam, but intermediate the ends of said bar, a first operator controlled switch, a second switch in series with the first switch and in the path of movement of the second cam, said second switch being in series with a welding transformer connected to the electrodes, control means for the movement of the second motor including a line connected in between the two switches so that operation of the first switch alone may operate the control means without energization of the transformer, said transformer being also energized when the second switch is closed.

References Cited in the file of this patent

UNITED STATES PATENTS

| | | |
|---|---|---|
| 1,898,873 | Fassler | Feb. 21, 1933 |
| 2,002,007 | Hanson | May 21, 1935 |
| 2,283,826 | Soehner | May 19, 1942 |
| 2,293,393 | Humphrey | Aug. 18, 1942 |
| 2,314,099 | Mikhalapov | Mar. 16, 1943 |
| 2,712,585 | Domeny | July 5, 1955 |